United States Patent
Elmer et al.

(10) Patent No.: US 8,046,400 B2
(45) Date of Patent: Oct. 25, 2011

(54) APPARATUS AND METHOD FOR OPTIMIZING THE PERFORMANCE OF X87 FLOATING POINT ADDITION INSTRUCTIONS IN A MICROPROCESSOR

(75) Inventors: Tom Elmer, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 867 days.

(21) Appl. No.: 12/100,583

(22) Filed: Apr. 10, 2008

(65) Prior Publication Data

US 2009/0259708 A1    Oct. 15, 2009

(51) Int. Cl.
G06F 7/485    (2006.01)

(52) U.S. Cl. ...................................................... 708/505

(58) Field of Classification Search .......................... None
See application file for complete search history.

(56) References Cited

U.S. PATENT DOCUMENTS

| | | | | |
|---|---|---|---|---|
| 4,839,846 | A * | 6/1989 | Hirose et al. ................... | 708/497 |
| 6,233,672 | B1 | 5/2001 | Lynch | |
| 2002/0107900 | A1* | 8/2002 | Enenkel et al. ............... | 708/501 |
| 2002/0198917 | A1* | 12/2002 | Steele, Jr. ....................... | 708/495 |
| 2003/0131036 | A1* | 7/2003 | Purcell ........................... | 708/505 |
| 2008/0307030 | A1* | 12/2008 | Ziv ................................. | 708/505 |

FOREIGN PATENT DOCUMENTS

| | | |
|---|---|---|
| WO | WO 9714094 | 4/1997 |
| WO | WO 2008036944 | 3/2008 |

OTHER PUBLICATIONS

Seidel et al. "On the Design of Fast IEEE Floating-Point Adders." Proceedings of the 15th IEEE Symposium on Computer Arithmetic (ARITH'01). 2001.

* cited by examiner

*Primary Examiner* — David H Malzahn
(74) *Attorney, Agent, or Firm* — E. Alan Davis; James W. Huffman (57) ABSTRACT

A microprocessor having a Precision Control (PC) field, an instruction dispatcher, and a Floating Point unit (FPU). The FPU receives an FP Add instruction from the instruction dispatcher, and generates a sum from its addends. The FPU determines whether any conditions exist in the addends with respect to their contribution to a rounding determination and relative to the PC field. If none of the conditions exists, the FPU makes the rounding determination based on the smaller addend and the PC field, and selectively rounds the sum based on the rounding determination. If any conditions exist, the FPU saves the sum and rounding information derived from the addends, and signals the instruction dispatcher to re-dispatch the instruction. On re-dispatch, the FPU makes the rounding determination based on the saved rounding information and the PC field, and selectively rounds the sum based on the rounding determination.

24 Claims, 5 Drawing Sheets

*Fig. 5* first predetermined condition:
   (1) effective addition OR exponent difference > 1; and
   (2) larger mantissa precision > precision specified by Precision Control (PC)

second predetermined condition:
   (1) effective subtraction;
   (2) exponent difference <= 1; and
   (3) at least one mantissa precision > precision specified by Precision Control (PC)

Fig. 6

APPARATUS AND METHOD FOR OPTIMIZING THE PERFORMANCE OF X87 FLOATING POINT ADDITION INSTRUCTIONS IN A MICROPROCESSOR

FIELD OF THE INVENTION

The present invention relates to mathematical operations on floating point numbers, and more particularly to a method and system for performing a high speed x87 floating point addition operation.

BACKGROUND OF THE INVENTION

Floating point numbers are typically represented by a sign bit, an exponent, and a mantissa (also referred to as the significand) that contains the significant digits of the floating point number. For example, when representing a normalized floating point number in the IEEE Standard 754 for binary floating point arithmetic, the mantissa comprises an integer "1" and a fraction following a binary point.

The x87 architecture is a popular architecture for performing floating point arithmetic. The x87 architecture is described in the IA-32 Intel Architecture Software Developer's Manual, Volume 1: Basic Architecture, June 2006, which is hereby incorporated by reference in its entirety for all purposes (referred to herein as the "Intel manual"). In particular, section 4.8 describes the representation of real numbers in various floating point formats; chapter 8 generally describes programming with the x87 FPU; and section 5.2 describes the specific x87 floating point unit (FPU) instructions.

There are three different floating point formats that must be supported by an x87 FPU: single precision format numbers are 32 bits comprising a 1-bit sign, an 8-bit exponent, and a 23-bit mantissa; double precision numbers are 64 bits comprising a 1-bit sign, an 11-bit exponent, and a 52-bit mantissa; and double extended-precision numbers are 80 bits comprising a 1-bit sign, a 15-bit exponent, 1 integer bit, and a 63-bit mantissa. The precision of a floating point number is limited to the number of bits in its mantissa. Thus, given an implied integer '1' bit to the left of the binary point in the single-precision and double-precision formats and the explicit integer '1' bit to the left of the binary point in the double extended-precision format, the precision of a single precision format floating point number is limited to 24 bits, the precision of a double precision format floating point number is limited to 53 bits, and the default precision of a double extended-precision format floating point number is limited to 64 bits. However, the precision of calculations performed on double extended-precision format floating point numbers may be limited to less than 64 bits, and the precision limit is determined by the programmer. An x87 FPU includes a Precision Control (PC) field in its Floating Point Control Word (FPCW) that determines whether the precision of its floating point calculations are 64, 53, or 24 bits. A program may write to the PC field to change the precision of the x87 FPU floating point calculations. For example, if the program writes to the PC field to specify single precision, then the x87 FPU generates results with 24 bits of precision, even though one or more of the addends may have greater than 24 bits of precision. That is, the FPU rounds the mantissa of the result by clearing to zero the bits that are of less arithmetic significance than the precision specified by the PC field.

One common set of floating point arithmetic instructions executed by an x87 FPU are the addition (and subtraction) instructions. A floating point addition instruction performs the calculation of Ra+Rb, where Ra and Rb are floating point addends. The mantissa of Ra is denoted here as A, and the mantissa of Rb is denoted B. Assume Ra is the larger addend and Rb is the smaller addend, i.e., Ra has a larger exponent than Rb. The x87 FPU shifts B right by a number of bits equal to the difference between the exponents of Ra and Rb in order to align the mantissa of the smaller addend with the mantissa of the larger addend. The x87 FPU then adds mantissa A to the aligned mantissa B to generate a resultant sum. The FPU then normalizes the sum to remove any leading zeroes. Finally, the FPU performs a rounding operation on the normalized sum.

The rounding operation may be critical with respect to the timing of the execution of a floating point addition instruction by an x87 FPU. An FPU executes instructions according to a clock signal having a frequency and period. For a given semiconductor manufacturing process technology employed and FPU design (e.g., the number of gate delays required to execute the addition instruction), the clock period might have to be lengthened to accommodate the time to perform the rounding operation to execute the instruction. In the alternative, it is typical for an FPU to execute addition instructions in multiple clock cycles. In this case, it is desirable from a performance perspective for an FPU to execute floating point addition instructions in the smallest number of clock cycles possible given the clock period, the number of gate delays required by the FPU design to execute the instruction, the semiconductor manufacturing process technology employed, etc.

The rounding operation may be determinative of whether or not an additional clock cycle is required to execute a floating point addition instruction, i.e., whether the FPU can execute the floating point addition instruction in N clock cycles or N+1 clock cycles. This is because the rounding determination (i.e., whether the sum of the addends needs to be rounded up by incrementing) for an addition instruction by an x87 FPU depends upon the precision of the addends relative to the precision specified by the PC field of the FPCW. More specifically, the fact that the programmer could specify a precision via the PC field that is different than the precision of one or both of the addends could cause the rounding determination to take longer under some conditions than in others. There may be some conditions under which the longer time to make the rounding determination would cause the total execution time of the instruction to require an additional clock cycle. Thus, for example, whereas an x87 FPU could be designed to execute a floating point addition instruction in three clock cycles for a first set of conditions of the precision of the addends and the precision specified by the PC field, the FPU may require four clock cycles to execute the instruction for a second set of conditions of the precision of the addends and the precision specified by the PC field because the rounding determination takes longer for the second set of conditions. Following are some specific examples of conditions of the precision of the addends relative to the precision specified by the PC field and their affect on the rounding determination time.

If the precision specified by the PC field is the same as the precision of the addends, then only the smaller addend contributes bits to the rounding operation (referred to herein as sticky bits) due to the mantissa alignment discussed above. In this case, the rounding determination may be performed in parallel with the addition of the larger addend and aligned smaller addend by simply examining the sticky bits of the smaller addend, namely the number of least significant bits shifted right during the alignment operation. That is, the rounding determination time is mostly, if not all, hidden by the time taken to perform the actual addition of the two addend mantissas.

However, if the precision of the larger addend is greater than the precision specified by the PC field, then the larger addend may also contribute sticky bits to the rounding determination. In this case, the x87 FPU must add the sticky bits contributed by each of the two addends in order to make the rounding determination. The addition of the sticky bits may take as long as the addition of the non-sticky bits of the mantissa, i.e., the upper bits that are within the precision specified by the PC field. The x87 FPU subsequently examines the sticky bits sum in order to make the rounding determination after the addition of the mantissas. Importantly in this case, unlike the case in which only the smaller addend contributes sticky bits, the FPU cannot make the rounding determination in parallel with the addition of the larger mantissa and aligned smaller mantissa. Rather, the FPU must wait to make the rounding determination until the addition of the sticky bits has completed.

Much work has been done to perform fast floating point add operations. For example, see ON THE DESIGN OF FAST IEEE FLOATING-POINT ADDERS, Seidel, et al., IEEE Computer Society, Proceedings of the 15th IEEE Symposium on Computer Arithmetic (ARITH '01). However, this paper fails to take into account the requirements imposed upon a commercially-viable x87 FPU with respect to the ability of the programmer to specify the precision of floating point number calculations via the PC field. Specifically, the paper assumes that only one of the addends will contribute sticky bits to the rounding determination. However, as discussed above, the peculiarities of the x87 architecture, namely the PC field, can create situations where both of the addends contribute bits to the rounding determination. Depending upon factors such as the clock frequency of the microprocessor and the number of gate delays within the various circuits of the x87 FPU (e.g., adders, shifters, and control logic circuits), the additional time required to perform the rounding determination in some cases, such as where both addends contribute sticky bits, may in some designs be enough to require an additional clock cycle for the x87 FPU to execute a floating point add instruction or the clock cycle to be undesirably lengthened.

One solution to the problem is to have the FPU execute floating point addition instructions in a variable number of clock cycles. However, this solution is undesirable with respect to instruction scheduling, particularly within a superscalar, out-of-order execution microprocessor. Another solution is to simply take the same greater number of clock cycles (four in the example above) to execute all floating point addition instructions, regardless of the set of conditions. However, this solution is obviously not a high performance solution.

Accordingly, what is needed is a solution that generates correct results of an x87 floating point addition instruction in cases where the rounding determination is relatively long, such as where both addends contribute sticky bits to the rounding determination, and yet does not penalize the time to execute an x87 floating point addition instruction in cases where the rounding determination is relatively short, such as where only one addend contributes sticky bits to the rounding determination.

BRIEF SUMMARY OF INVENTION

The present inventors have advantageously observed from analysis of popular commercial software applications and benchmarks that the proportion of x87 floating point addition instructions that present the longer cases (e.g., the case in which both addends contribute bits to the rounding determination and therefore require an addition of the sticky bits from each addend before the rounding determination can be made) that would require an additional clock cycle in embodiments of their x87 FPU is very small relative to the proportion of x87 floating point addition instructions that present the shorter cases (e.g., the case in which only the smaller addend contributes bits to the rounding determination, enabling the rounding determination to be made roughly in parallel with the addition of the addends) that would not require an additional clock cycle, but may instead be executed by the FPU within the desired number of clock cycles, which in one embodiment is two clock cycles. Consequently, the present invention employs a system-wide approach to the problem described above that takes advantage of the fact that an x87 FPU may be integrated into a larger microprocessor system. The microprocessor distinguishes between long and short cases, i.e., cases which would require an additional clock cycle and cases which would not. The long cases are those in which at least one of a set of predetermined conditions exists in the addends of the floating point addition instruction with respect to their contribution to a rounding determination relative to the precision specified by the PC field, such as that both addends contribute sticky bits to the rounding determination; whereas, the short cases are those which do not satisfy any of the set of predetermined conditions. In the long cases, the x87 FPU coordinates with the microprocessor's instruction dispatcher to execute the add instruction in two parts on two separate dispatches of the addition instruction: an initial dispatch by the instruction dispatcher and a re-dispatch (also referred to as a "replay") by the instruction dispatcher. Conversely, in the short cases, the x87 FPU fully executes the instruction on the initial dispatch. In the cases in which a replay of the addition instruction is required, the FPU saves intermediate results from the initial dispatch execution and receives the saved intermediate results on the re-dispatch to complete execution of the instruction. Although because the total time required under this approach to execute an x87 floating point addition instruction when a replay is required is greater than simply taking an additional clock cycle for all x87 floating point additions, the approach advantageously enables the x87 FPU to execute instructions when a replay is not required without taking an additional clock cycle. The present inventors have observed that a microprocessor embodying this approach provides significant performance improvement in popular commercial software applications and benchmarks over previous approaches. Apparently this performance improvement is observed because the percentage of cases that do not require a replay is so much greater than the percentage of cases that require a replay that the benefit of faster execution time in the short cases outweighs the disadvantage of slower execution time in the long cases in the aggregate.

In one aspect, the present invention includes a microprocessor. The microprocessor includes comprising an x87 Floating Point Control Word (FPCW) including a Precision Control (PC) field, an instruction dispatcher, and a Floating Point Unit (FPU). The (PC) field is programmable for specifying a precision of floating point (FP) calculations made by an FPU of the microprocessor. The instruction dispatcher is configured to dispatch an x87 FP addition instruction (FP ADD) to the FPU, with the FP ADD having first and second FP addends. The mantissas of the first and second addends potentially include bits of lesser arithmetic significance than a precision specified by the PC field. The FPU adds the first and second addends to generate a sum. The FPU then determines whether any predetermined conditions exist in the first and second addends with respect to their contribution to a rounding determination of the sum and relative to the precision specified by the PC field. If none of the predetermined conditions exists, then the FPU makes the rounding determination based on bits of the mantissa of the smaller of the first and second addends and the precision specified by the PC field. It then selectively rounds the sum based on the rounding determination for generating a final result of the FP ADD. If one of the predetermined conditions exists, the FPU saves the sum and rounding information derived from the first and second addends. It then signals the instruction dispatcher to re-dispatch the FP ADD to the FPU. In response to the instruction dispatcher re-dispatching the FP ADD to the FPU, the FPU makes the rounding determination based on the saved rounding information and the precision specified by the PC field. Following this, the FPU selectively rounds up the sum based on the rounding determination for generating the final result.

In another aspect, the present invention includes a method for processing an x87 floating point addition instruction (FP ADD) in a microprocessor having a FP unit (FPU), an instruction dispatcher, and an x87 Floating Point Control Word (FPCW) including a Precision Control (PC) field. The instruction dispatcher initially dispatches an x87 FP ADD to the FPU, with the FP ADD having a first and a second FP addend. The mantissas of the first and second addends potentially include bits of lesser arithmetic significance than a precision specified by the PC field. The FPU adds the first and second addends to generate a sum. After generating the sum, the FPU determines whether any predetermined conditions exist in the first and second addends with respect to their contribution to a rounding determination of the sum and relative to the precision specified by the PC field. If none of the predetermined conditions exists, then the FPU makes the rounding determination based on bits of the mantissa of the smaller of the first and second addends and the precision specified by the PC field. It then selectively rounds the sum based on the rounding determination for generating a final result of the FP ADD. If a predetermined condition exists, the FPU saves the sum and rounding information derived from the first and second addends, and signals the instruction dispatcher to re-dispatch the FP ADD to the FPU. In response to the instruction dispatcher re-dispatching the FP ADD to the FPU, the FPU makes the rounding determination based on the saved rounding information and the precision specified by the PC field. The FPU then selectively rounds up the sum based on the rounding determination for generating the final result.

In yet another aspect, the present invention includes a computer program product for use with a computing device including a computer readable storage medium. The computer readable storage medium has computer readable program code embodied in the computer readable storage medium for providing a microprocessor. The computer readable program code includes first program code for providing an x87 Floating Point Control Word (FPCW) including a Precision Control (PC) field. The computer readable program code also includes second program code for providing an instruction dispatcher. The computer readable program code also includes third program code for providing a floating point processing (FPU) function. The PC field of the FPCW specifies a precision of floating point (FP) calculations made by the FPU. The instruction dispatcher is configured to dispatch an x87 FP addition instruction (FP ADD) to the FPU. The FP ADD has first and second FP addends, where mantissas of the first and second addends potentially include bits of lesser arithmetic significance than a precision specified by the PC field. The FPU adds the first and second addends to generate a sum. It then determines whether any predetermined conditions exist in the first and second addends with respect to their contribution to a rounding determination of the sum and relative to the precision specified by the PC field. If none of the predetermined conditions exists, the FPU makes the rounding determination based on bits of the mantissa of the smaller of the first and second addends and the precision specified by the PC field. The FPU then selectively rounds the sum based on the rounding determination for generating a final result of the FP ADD. If any predetermined conditions exist, the FPU saves the sum and rounding information derived from the first and second addends, and signals the instruction dispatcher to re-dispatch the FP ADD to the FPU. In response to the instruction dispatcher re-dispatching the FP ADD to the FPU, the FPU makes the rounding determination based on the saved rounding information and the precision specified by the PC field. It then selectively rounds the sum based on the rounding determination for generating the final result.

DETAILED DESCRIPTION OF THE INVENTION

Figure 3:
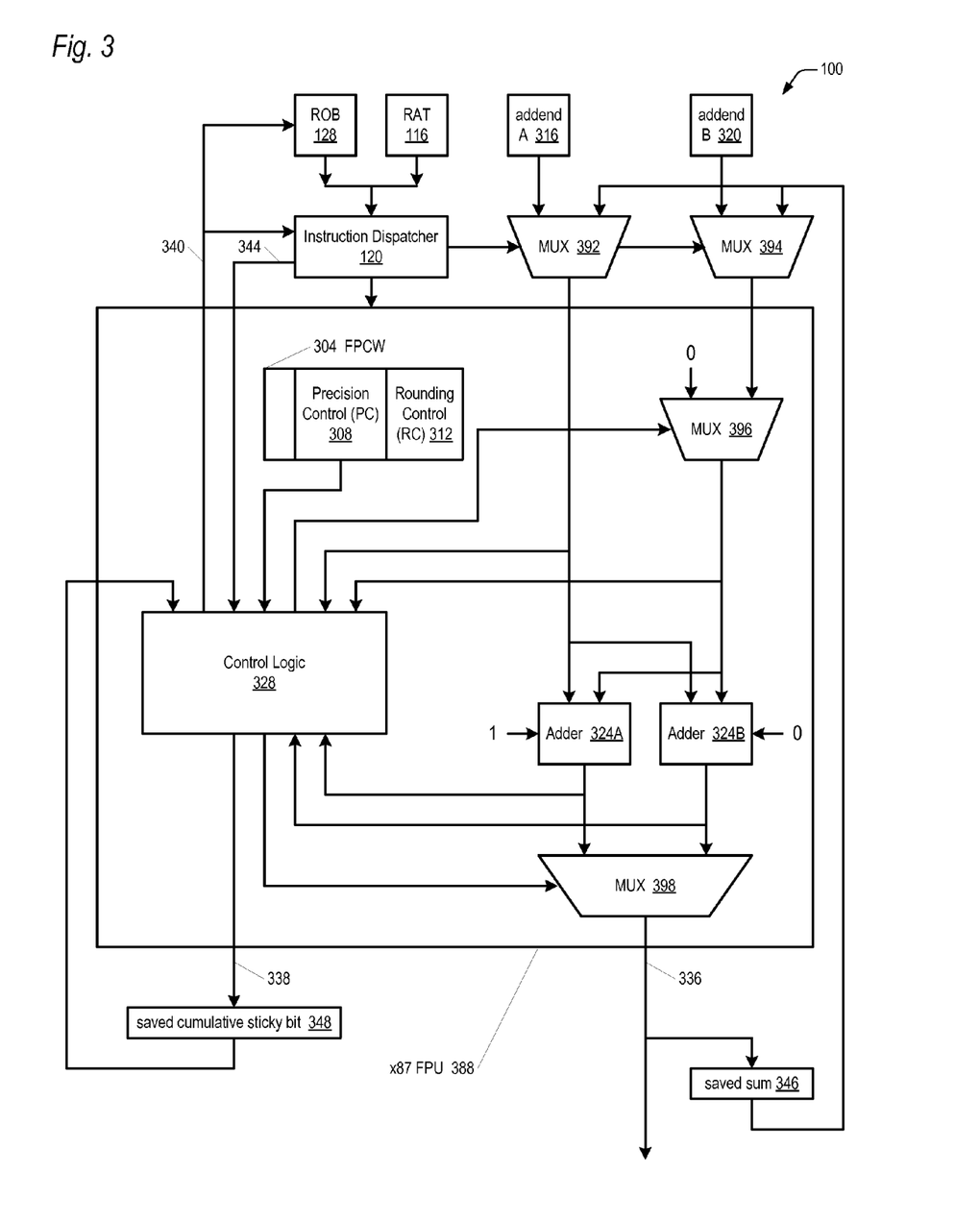
FIG. 3 is a block diagram illustrating an x87 FPU of the microprocessor of FIG. 1 according to the present invention.

The term "sticky bits" refers to the bits of an addend after alignment, if necessary (such as the aligned smaller addend), of a floating point addition instruction that have less arithmetic significance than the precision specified by the PC field 308 of FIG. 3. Stated alternatively, the sticky bits are the bits of an addend that have less arithmetic significance than the least representable bit of the result as specified by the PC field 308.

Figure 1:
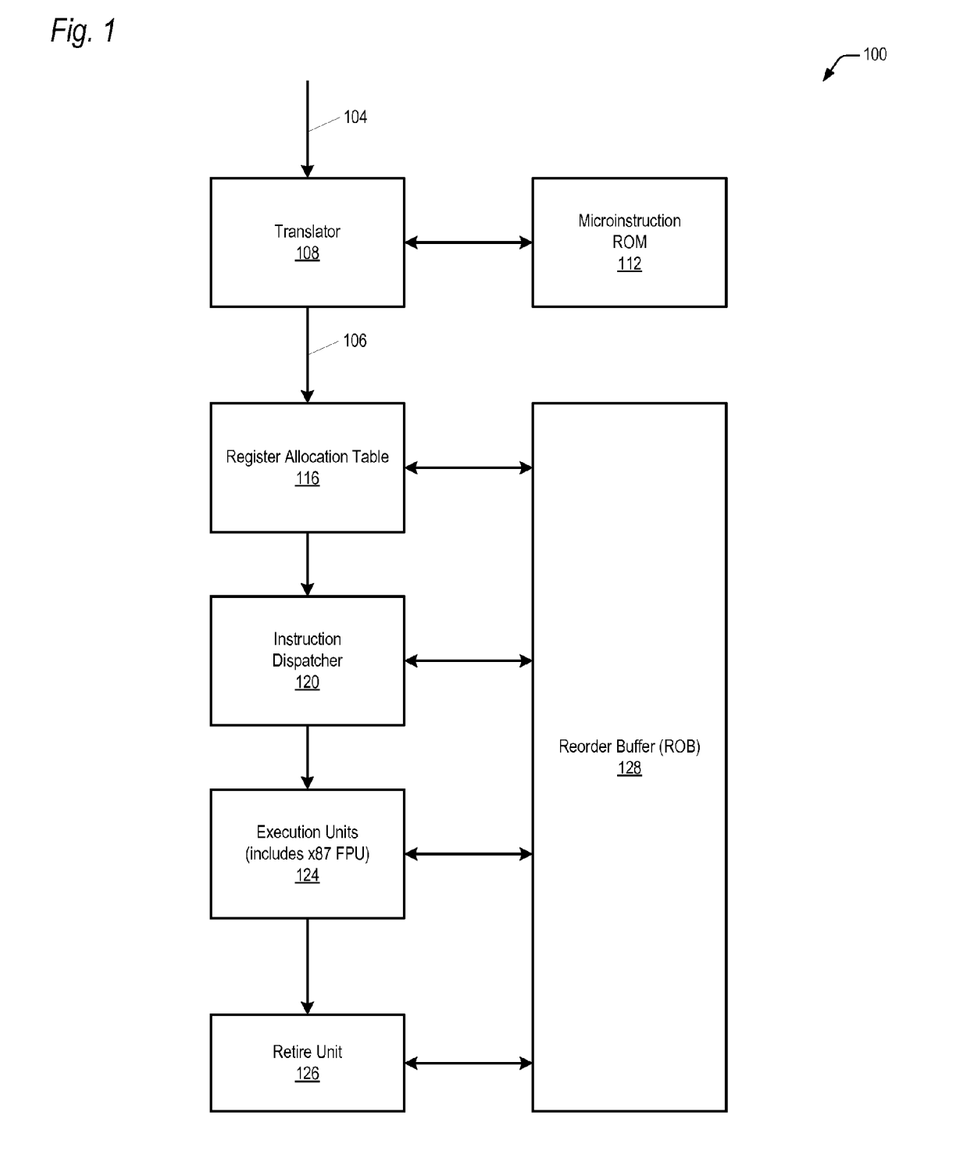
FIG. 1 is a block diagram illustrating a microprocessor according to the present invention.

Referring to FIG. 1, a block diagram illustrating a microprocessor 100 according to the present invention is shown. The microprocessor 100 includes a Translator 108 coupled to a Microinstruction ROM 112. The Translator 108 receives x86 macroinstructions 104 and translates them into one or more microinstructions 106. In one embodiment, the x86 macroinstructions 104 comprise instructions of the well-known IA-32 architecture, such as those specified in the Intel manual incorporated by reference above. In particular, the macroinstructions 104 include x87 floating point (FP) addition macroinstructions. The x87 floating point addition macroinstructions 104 may include, but are not limited to, the following well-known instructions: FADD, FADDP, FIADD, FSUB, FSUBP, FISUB, FSUBR, FSUBRP, FCOM, FCOMP, FCOMPP, FCOMI, FCOMIP, FUCOMI, FUCOMIP, FICOM, FICOMP, FILD, FIST, FISTP, FISTTP, FST, FSTP, FISUBR, FUCOM, FUCOMP, and FUCOMPP. The Microinstruction ROM 112 includes microinstruction sequences that the Translator 108 calls in response to complex and/or infrequently executed x86 macroinstructions, as opposed to translating the x86 macroinstructions directly into microinstructions. In one embodiment, the micro-architecture of the microprocessor 100 is a RISC-style micro-architecture that executes the microinstructions 106, which are generally simpler than the x86 macroinstructions and conform to the RISC-style load/store paradigm.

The microprocessor 100 pipeline also includes a Register Allocation Table (RAT) 116 coupled to the Translator 108, an Instruction Dispatcher 120 (or Instruction Scheduler 120) coupled to the RAT 116, Execution Units 124 coupled to the Instruction Dispatcher 120, and a Retire Unit 126 coupled to the Execution Units 124. The Execution Units 124 include a Media A Unit 204 (of FIG. 2) that includes an x87 FPU 388 (of FIG. 3), which are described in more detail below. The microprocessor 100 also includes a Reorder Buffer (ROB) 128 coupled to the RAT 116, Instruction Dispatcher 120, Execution Units 124, and Retire Unit 126.

In one embodiment, the microprocessor 100 is an out-of-order execution microprocessor. That is, the Execution Units 124 execute the microinstructions 106 out-of-order with respect to the program order. However, the ROB 128 is used to guarantee that the microinstructions 106 and their associated macroinstructions 104 are retired in program order. Furthermore, the Translator 108 translates the macroinstructions 104 in program order and generates the microinstructions 106 in program order. Additionally, the RAT 116 allocates entries in the ROB 128 in program order. The ROB 128 is a circular FIFO buffer that receives the microinstructions 106 from the RAT 116 in program order and is used by the Retire Unit 126 to retire microinstructions 106 and their associated macroinstructions 104 in program order.

The RAT 116 receives the microinstructions 106 from the Translator 108 and detects dependencies between the microinstructions 106. In particular, the RAT 116 determines dependencies of microinstruction source operands, such as x87 FP addition instruction addends on the results of other microinstructions. When the RAT 116 receives a microinstruction 106 it allocates the next available entry in the ROB 128 and stores the microinstruction 106 and its associated dependency information into the allocated ROB 128 entry.

The Instruction Dispatcher 120 receives the microinstructions 106 and dependency information from the RAT 116. The Instruction Dispatcher 120 schedules the un-dispatched microinstructions 106 in the ROB 128 to their appropriate Execution Unit 124. In particular, the Instruction Dispatcher 120 dispatches microinstructions, such as microinstructions translated from x87 floating point addition instructions, to the Media A 204 execution unit (of FIG. 2) since it contains the x87 FPU 388 (of FIG. 3). Each Execution Unit 124 includes a reservation station (not shown) that buffers microinstructions 106 for the respective Execution Unit 124. When the Instruction Dispatcher 120 determines that the ROB 128 has an un-dispatched microinstruction 106 of the type to be executed by an Execution Unit 124 with an empty reservation station entry, the Instruction Dispatcher 120 dispatches the microinstruction 106 to the appropriate Execution Unit 124 and updates the ROB 128 to indicate that the microinstruction 106 has been dispatched. Once all the source operands upon which the microinstruction 106 depends are available, issue logic issues the microinstruction 106 from the reservation station to the portion of the Execution Unit that executes the instruction.

In one embodiment, the ROB 128 includes 48 entries. Each ROB 128 entry has an index, or tag. The tag identifies the microinstruction 106 in the ROB entry. When an Execution Unit 124 completes execution of a microinstruction 106, the Execution Unit 124 provides the tag of the executed microinstruction 106 to the ROB 128 and to the Retire Unit 126. The ROB 128 then updates a flag in the entry associated with the executed microinstruction 106 to indicate that the microinstruction 106 is ready to be retired. As discussed above, the Retire Unit 126 retires the completed microinstructions 106 and their associated macroinstructions 104 in program order from the ROB 128.

Figure 5:
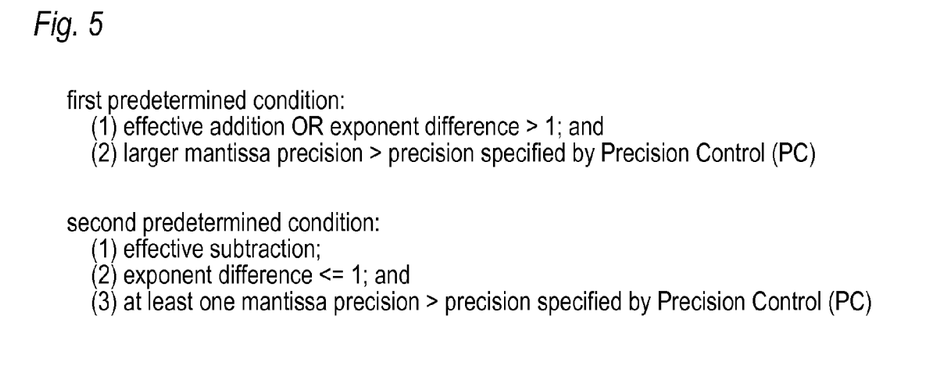
FIG. 5 is a depiction illustrating a set of predetermined conditions exists in addends of a floating point addition instruction with respect to their contribution to a rounding determination relative to the precision specified by the PC field of the FPCW of FIG. 3 according to one embodiment of the present invention.

Advantageously, the x87 FPU 388 includes the ability to request the Instruction Dispatcher 120 and ROB 128 to replay an x87 floating point addition microinstruction 106 when any of a set of predetermined conditions exists in addends of a floating point addition instruction with respect to their contribution to a rounding determination relative to the precision specified by the PC field 308 of the FPCW 304 of FIG. 3, as discussed herein, such as according to the embodiment of FIG. 5.

Figure 2:
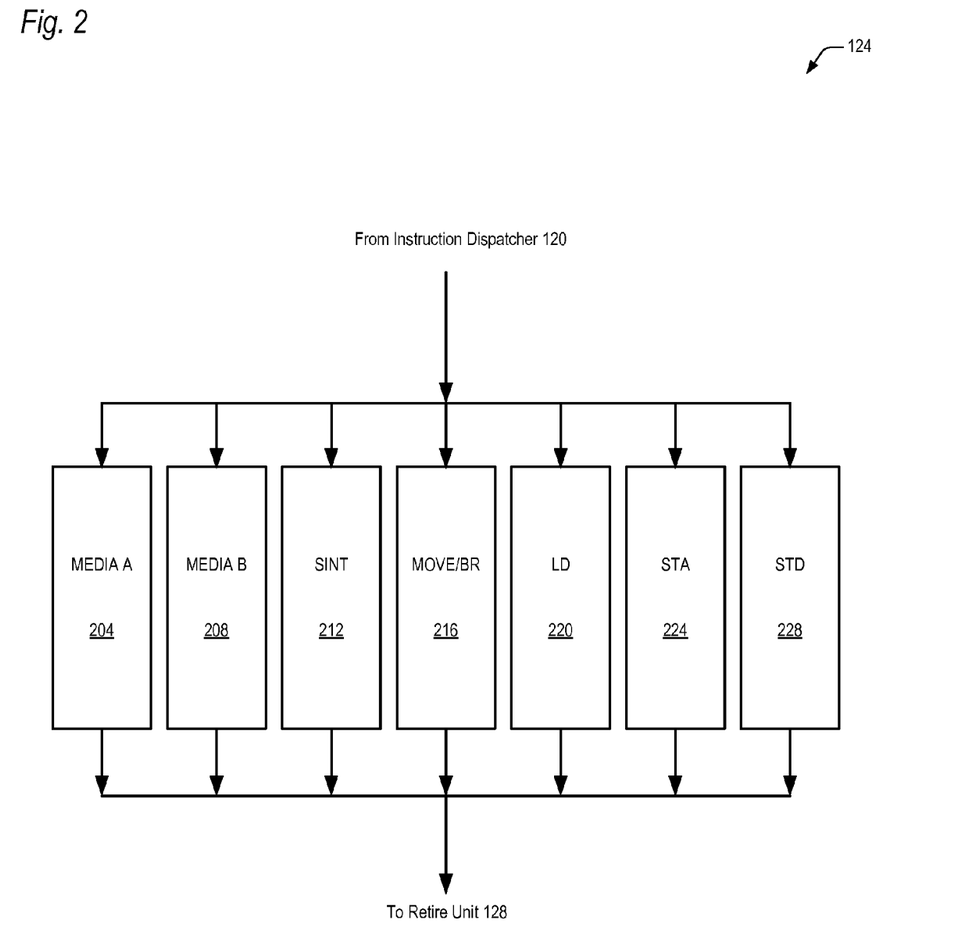
FIG. 2 is a block diagram illustrating the Execution Units of FIG. 1 according to the present invention.

Referring now to FIG. 2, a block diagram illustrating the Execution Units 124 of FIG. 1 according to the present invention is shown. In one embodiment, there are seven different Execution Units 124, denoted 204 through 228, which are designed to execute in parallel with and independently from each other. The first execution unit, denoted MEDIA A 204, executes floating point microinstructions and includes the x87 FPU 388 of FIG. 3. The second execution unit, denoted MEDIA B 208, executes multiply operations. The third execution unit, denoted SINT (Simple Integer) 212, executes integer ALU operations. The fourth execution unit, denoted MOV/BR (Move/Branch) 216, executes move or branch microinstructions as well as simple ALU operations that the SINT unit also performs. The fifth execution unit, denoted LD (Load Data) 220, fetches data, such as addends for floating point additions, from memory into registers of the microprocessor 100. The sixth execution unit, denoted STA (Store Address) 224, calculates the destination address for a store operation and allocates a store buffer for it. The seventh execution unit, denoted STD (Store Data) 228, stores the results of computations from registers to an address in memory specified by the Store Address execution unit 224.

Referring now to FIG. 3, a block diagram illustrating an x87 FPU 388 of the microprocessor 100 of FIG. 1 according to the present invention is shown. In one embodiment, the x87 FPU 388 is included within the Media A Unit 204 of FIG. 2. The ROB 128 and RAT 116 are coupled to the Instruction Dispatcher 120 of FIG. 1, which is coupled to the x87 FPU 388. The Instruction Dispatcher 120 initially dispatches microinstructions received from the RAT 116, such as an x87 floating point addition microinstruction translated from an x87 floating point macroinstruction, to the x87 FPU 388. The Instruction Dispatcher 120 also re-dispatches x87 floating point addition microinstructions received from the ROB 128 to the x87 FPU 388 when at least one of a set of predetermined conditions in the instruction addends with respect to their contribution to a rounding determination relative to the precision specified by the PC field 308 of the FPCW 304 is satisfied, as discussed below with respect to FIG. 5, for example. The Instruction Dispatcher 120 controls two muxes 392 and 394 that provide operands to the FPU 388. The mux 392 receives as inputs an addend A 316 and a saved sum 346 (from the FPU 388 as discussed below). The mux 394 receives as inputs an addend B 320 and the saved sum 346. The Instruction Dispatcher 120 controls the muxes 392/394 to select the addends 316/320 when the Instruction Dispatcher 120 performs an initial dispatch of an instruction to the x87 FPU 388, and controls the muxes 392/394 to select the saved sum 346 when the Instruction Dispatcher 120 re-dispatches an x87 floating point addition microinstruction to the x87 FPU 388, as described herein such as with respect to block 628 of FIG. 6. The x87 FPU 388 includes circuitry for executing all the x87 floating point instructions; however, only some of the circuitry that performs x87 floating point addition instructions is shown in FIG. 3. The x87 FPU 388 includes a two-input round-up Adder 324A and a two-input non-round-up Adder 324B, a two-input mux 396, a two-input mux 398, Control Logic 328, and a Floating Point Control Word (FPCW) 304 that includes the x87 Precision Control (PC) field 308 and a Rounding Control (RC) field 312. The programmer may program various values into the RC field 312 to control the rounding mode used by the x87 FPU 388 to round its results.

The mux 398 receives on its inputs the outputs of the respective Adders 324A and 324B. In cases in which none of the set of predetermined conditions exists as determined below with respect to block 612 FIG. 6, the Control Logic 328 generates the control signal to cause the mux 398 to select one of the inputs for outputting as a resultant sum 336, as described with respect to block 616 of FIG. 6, depending upon the rounding determination made at block 614 of FIG. 6. In cases in which at least one of the set of predetermined conditions exists upon initial dispatch of the floating point addition instruction as determined below with respect to block 612, the Control Logic 328 generates the control signal to cause the mux 398 to select the non-rounded-up sum of adder B 324B and saves the resultant sum 346 in a register 346, as described with respect to block 622 of FIG. 6. The x87 FPU 388 receives the saved sum 346 in response to the re-dispatch of the floating point addition instruction by the Instruction Dispatcher 120 to the x87 FPU 388, as described with respect to block 628 of FIG. 6. In response to the re-dispatch of the floating point addition instruction, the Control Logic 328 generates a control signal to cause the mux 398 to select one of the inputs for outputting as a resultant sum 336, as described with respect to block 634 of FIG. 6, depending upon the rounding determination made at block 632 of FIG. 6. It is noted that the term "sum" is used herein to refer to both the result of an effective addition operation and the result of an effective subtraction operation, unless otherwise specified. An effective addition operation is performed when the sign bits of the addends 316/320 are the same and the floating point addition instruction specifies an addition operation of the addends, or the sign bits of the addends 316/320 are different and the floating point addition instruction specifies a subtraction operation of the addends. An effective subtraction is performed when the sign bits of the addends 316/320 are different and the floating point addition instruction specifies an addition operation of the addends, or the sign bits of the addends 316/320 are the same and the floating point addition instruction specifies a subtraction operation of the addends.

Each of the Adders 324 receives on its inputs the output of the mux 392 and the output of the mux 396. The mux 394 receives on one input addend B 320 and receives on its other input the saved sum 346. The mux 396 receives on one input the output of mux 394 (i.e., either addend B 320 or the saved sum 346) and receives on its other input a 64-bit zero value. The Control Logic 328 generates a control signal to cause the mux 396 to select one of its inputs for outputting to the Adders 324, as described below. Additionally, Adder A 324A receives a binary '1' value carry-in bit, and Adder B 324B receives a binary '0' value carry-in bit. Thus, Adder A 324A generates a rounded-up sum of the addend A 316 and addend B 320 on the initial dispatch of the floating point addition instruction, or generates a rounded-up saved sum 346 on the re-dispatch of the floating point addition instruction, as described below. Similarly, Adder B 324B generates a non-rounded-up sum of addend A 316 and addend B 320 on the initial dispatch of the floating point addition instruction, or generates a non-rounded-up saved sum 346 on the re-dispatch of the floating point addition instruction, as described below. In one embodiment, the Adders 324A and 324B are 64-bit adders that receive 64-bit addends and generate a 64-bit sum.

The addends 316/320 may be supplied from multiple sources. One source is registers of the IA-32 architecture floating point register set. Another source is rename registers for storing the results of the instructions stored in the ROB 128 of FIG. 1. Another source is temporary registers of the microprocessor 100. Another source is results of instructions executed by the various Execution Units 124 forwarded directly to the x87 FPU 388.

As described above, the PC field 308 value determines whether the precision of the x87 FPU 388 floating point calculation result is 64, 53, or 24 bits; however, the FPU 388 may make intermediate calculations internally with higher precision than the precision specified by the PC field 308. A program may write to the PC field 308 to change the precision of the x87 FPU 388 floating point calculations. For example, if the program writes to the PC field 308 to specify double precision, then the x87 FPU 388 generates results with 53 bits of precision, even though one or more of the addends have greater than 53 bits of precision. That is, the FPU clears to zero the lower unused bits, i.e., the bits that are of less arithmetic significance than the precision specified by the PC field 308, and provides the conditionally incremented 53-bit result.

The Control Logic 328 receives as inputs: the PC field 308 value, the outputs of the mux 392 and the mux 396, and the outputs of Adder A 324A and Adder B 324B. The Control Logic 328 uses the inputs determine whether at least one of the set of predetermined conditions exists in the first 316 and second 320 addends with respect to their contribution to a rounding determination relative to the precision specified by the PC field 308 of the FPCW 304. Additionally, the Control Logic 328 uses the inputs to generate a cumulative sticky bit 338, as described with respect to block 622 of FIG. 6, which is saved in a register 348, as described with respect to block 622. The Control Logic 328 also uses the inputs along with the saved cumulative sticky bit 348 to make the rounding determination, as described with respect to block 632 of FIG. 6. The Control Logic 328 includes logic (not shown) that determines the precision of the addends 316/320 of the floating point addition instruction, such as performed at block 608 of FIG. 6.

Figure 6:
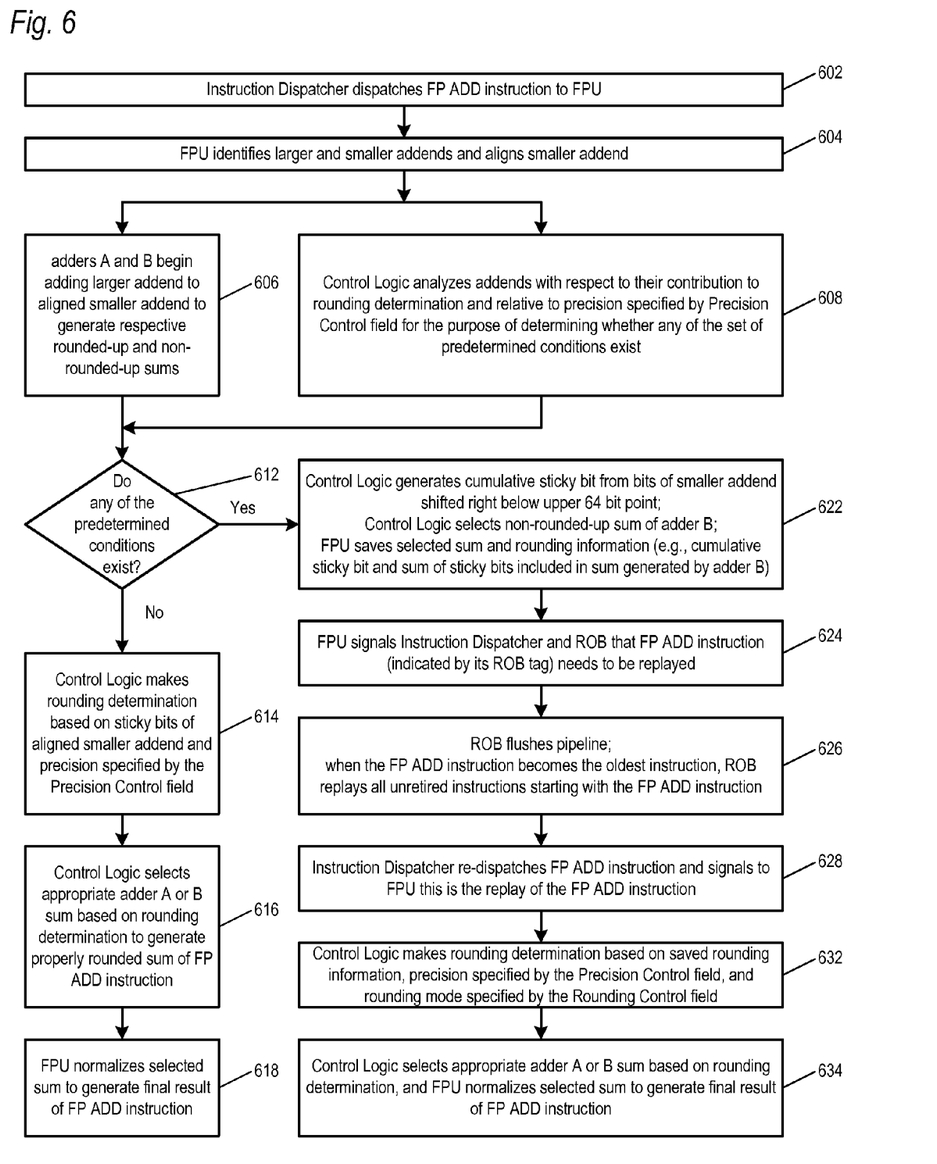
FIG. 6 is a flowchart illustrating operation of the microprocessor of FIG. 1 to perform x87 floating point addition instructions according to the present invention.

The Control Logic 328 also generates a signal 340 to the Instruction Dispatcher 120 and ROB 128 to request a replay of the floating point addition instruction if one of the set of predetermined conditions exists, as described at block 624 of FIG. 6. The Control Logic 328 also receives a signal 344 from the Instruction Dispatcher 120 indicating that the Instruction Dispatcher 120 is now re-dispatching the floating point addition instruction, as described at block 628 of FIG. 6.

The x87 FPU 388 also includes a shifter (not shown) that shifts the mantissa of the smaller addend by a number of bits equal to the difference between the exponent of the larger addend and the exponent of the smaller addend in order to align the smaller addend mantissa with the larger addend mantissa before provision to the adders 324A and 324B. The larger addend is the addend that has the largest exponent of the two addends 316/320. If the exponents are equal, the x87 FPU 388 arbitrarily chooses one of the addends to be the larger addend, and subsequently corrects the sign of the final result 336, if necessary, i.e., if the arbitrary choice was incorrect. The x87 FPU 388 also includes a shifter (not shown) that receives the output of the mux 398 and shifts the selected input to normalize the result 336. Once the FPU 388 completes the floating point addition instruction, the FPU 388 provides the final result 336 to the Retire Unit 126, which subsequently retires the result 336 to the architected IA-32 floating point register specified by the floating point addition instruction.

In one embodiment, the x87 FPU 388 includes two distinct paths, known as a "far path" and a "near path" or "round path" and "normalize path", referred to herein as the "R-path" and the "N-path", which are well-known in the art of floating point addition units. The two paths may be generally similar to the arrangement described in the paper ON THE DESIGN OF FAST IEEE FLOATING-POINT ADDERS, Seidel, et al., IEEE Computer Society, Proceedings of the 15th IEEE Symposium on Computer Arithmetic (ARITH '01), which is hereby incorporated by reference in its entirely for all purposes. The N-path computes effective subtractions (either an addition instruction in which the two operands have different signs, or a subtraction instruction in which the two operands have the same sign) in which the operands have exponent differences less than or equal to 1, and the R-path computes all other cases. The R-path is shown in FIG. 3; however, the N-path is not shown in FIG. 3. Each path executes the floating point addition instruction in parallel, and the Control Logic 328 selects the result from one of the paths as the final result 336.

Figure 4A:
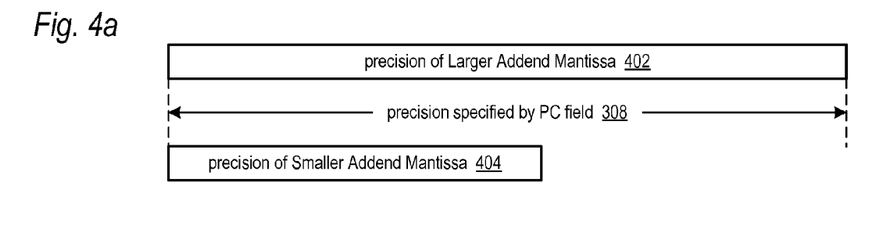
FIGS. 4a, 4b, 4c, and 4d are four block diagrams illustrating the four possible combinations of the relationship between the precision of the two addends of an x87 floating point addition instruction relative to the precision specified by the PC field according to the present invention.
Figures 4B, 4C:
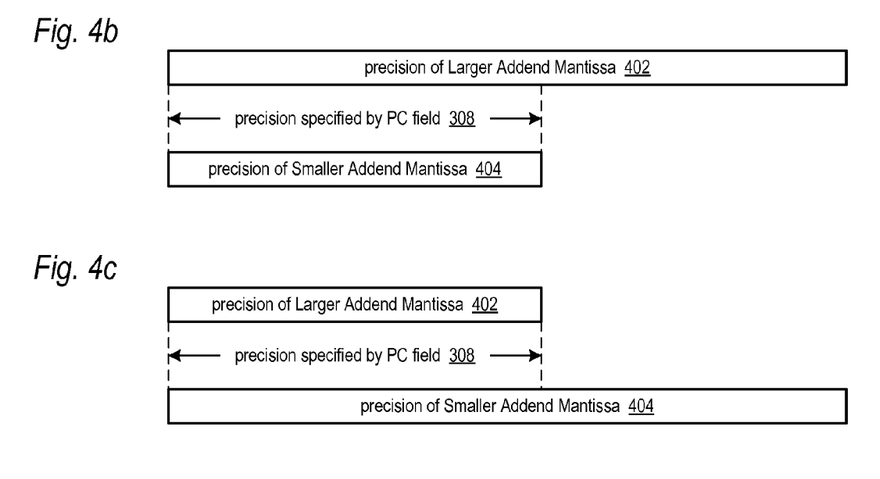
Figure 4D:
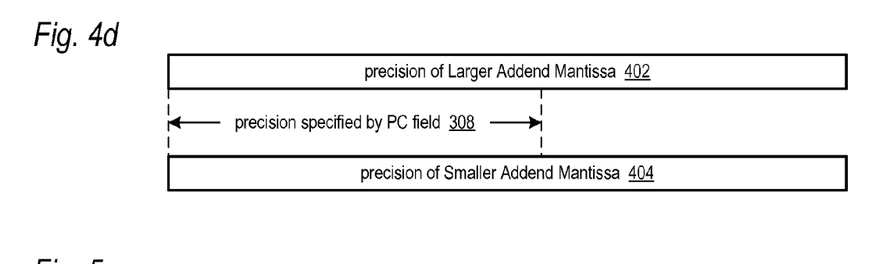

Referring now to FIG. 4, four block diagrams illustrating the four possible combinations of the relationship between the precision of the two addends of an x87 floating point addition instruction relative to the precision specified by the PC field 308 are shown. The four block diagrams are denoted 4a, 4b, 4c, and 4d. These combinations are relevant to the determination of whether at least one of a set of predetermined conditions exists in the addends 316/320 with respect to their contribution to a rounding determination of their intermediate sum and relative to the precision specified by the PC field 308, for example as described with respect to FIG. 5. The precision of an addend 316/320 is defined herein as the number of bits between and inclusive of the leading and trailing binary '1' value bits in the mantissa of the addend 316/320. In one embodiment, the Control Logic 328 of FIG. 3 includes precision determination logic that determines the precision of the addends 316/320 as they are received. The Control Logic 328 uses the precision information from the precision determination logic, along with the alignment operation shift amount in the case of the smaller addend, to determine whether the addends 316/320 will contribute sticky bits to the rounding determination. It should be noted that the precision determination is not to be confused with the determination of which addend is the larger addend (referred to in FIG. 4 as 402) and which addend is the smaller addend (referred to in FIG. 4 as 404), which the FPU 388 performs by comparing the addend 316/320 exponents, as described with respect to block 604 of FIG. 6.

FIG. 4a depicts the case in which the mantissas of both the larger addend 402 and the smaller addend 404 have equal or less precision than the precision specified by the PC field 308 of the FPCW 304 of FIG. 3. In this case, the mantissa of the larger addend 402 will not contribute any sticky bits to the rounding determination. However, the aligned mantissa of the smaller addend 404 may contribute sticky bits to the rounding determination depending upon the amount of right-shifting to perform the alignment.

FIG. 4b depicts the case in which the mantissa of the smaller addend 404 has equal or less precision than the precision specified by the PC field 308, and the mantissa of the larger addend 402 has greater precision than the precision specified by the PC field 308. In this case, the mantissa of the larger addend 402 will contribute sticky bits to the rounding determination. However, the aligned mantissa of the smaller addend 404 may contribute sticky bits to the rounding determination depending upon the amount of right-shifting to perform the alignment. Thus, in this case the possibility exists that both addends 402/404 (316/320) will contribute to the rounding determination. More specifically, the possibility exists that the addends 402/404 (316/320) will need to be added before the rounding determination can be made.

FIG. 4c depicts the case in which the mantissa of the larger addend 402 has equal or less precision than the precision specified by the PC field 308, and the mantissa of the smaller addend 404 has greater precision than the precision specified by the PC field 308. In this case, the mantissa of the larger addend 402 will not contribute any sticky bits to the rounding determination. However, the aligned mantissa of the smaller addend 404 may contribute sticky bits to the rounding determination.

FIG. 4d depicts the case in which the mantissas of both the larger addend 402 and the smaller addend 404 have greater precision than the precision specified by the PC field 308. In this case, the mantissa of both the larger addend 402 and the smaller addend 404 will contribute sticky bits to the rounding determination.

Referring now to FIG. 5, a depiction illustrating a set of predetermined conditions exists in addends of a floating point addition instruction with respect to their contribution to a rounding determination relative to the precision specified by the PC field 308 of the FPCW 304 of FIG. 3 according to one embodiment of the present invention is shown. The x87 FPU 388 of FIG. 3 will request a replay of the floating point addition instruction in response to detecting any of the set of predetermined conditions in the instruction addend 316/320 mantissa bits with respect to their contribution to a rounding determination relative to the precision specified by the PC field 308 of FIG. 3. The embodiment of FIG. 5 includes two predetermined conditions in the set.

The first predetermined condition is: (1) the instruction instructs the x87 FPU 388 to perform an effective addition operation OR the difference between the exponents of the addends 316/320 is greater than 1; and (2) the precision of the larger addend mantissa is greater than the precision specified by the PC field 308. When the first predetermined condition is satisfied there is a possibility that both addend 316/320 mantissas will contribute sticky bits to the effective addition or effective subtraction operation, which requires an addition or subtraction of the sticky bits before the rounding determination can be made, which would require an extra clock cycle to perform the floating point addition instruction, according to one embodiment of the microprocessor 100 process technology and x87 FPU 388 design. Consequently, when the Control Logic 328 detects the first predetermined condition is satisfied at block 612, the Control Logic 328, among other things, requests a replay of the instruction, as described with respect to block 624 of FIG. 6.

The second predetermined condition is: (1) the instruction instructs the x87 FPU 388 to perform an effective subtraction operation; (2) the difference between the exponents of the addends 316/320 is less than or equal to 1; and (3) the mantissa of at least one of the addends 316/320 is greater than the precision specified by the PC field 308. When the second predetermined condition is satisfied and the exponents of the two addends 316/320 are equal, there is a possibility that the effective subtraction operation will cause cancellation of multiple upper bits of the addend 316/320 mantissas (sometimes referred to as "mass cancellation"), resulting in leading zeros in the resultant intermediate difference, which would require a left-shift by multiple bits to normalize the resultant difference. Because the amount of the left-shift is not known until after the subtraction operation is performed, the Control Logic 328 cannot know which bits of the resultant difference will be the sticky bits that contribute to the rounding determination, which prevents the Control Logic 328 from making the rounding determination in parallel with the effective subtraction operation. Consequently, when the Control Logic 328 detects the second predetermined condition is satisfied at block 612, the Control Logic 328, among other things, requests a replay of the instruction, as described with respect to block 624 of FIG. 6.

When the second predetermined condition is satisfied and the absolute value of the difference between the exponent of the minuend and the exponent of the subtrahend equals one, the smaller operand will need to be shifted right one bit. In any case, the minuend will be selected as the operand having the larger exponent. That is, regardless of the initial order, the smaller operand will be the shifted operand. If the least significant bit of the shifted operand is a binary '1' value, the possibility exists that a 65-bit difference will be generated in which the least significant bit is a binary '1' value, which would be the lone sticky bit that may require the intermediate difference to be rounded up. However, the Control Logic 328 cannot make this rounding determination until the subtraction operation is performed, which prevents the Control Logic 328 from making the rounding determination in parallel with the effective subtraction operation. Consequently, when the Control Logic 328 detects the second predetermined condition is satisfied at block 612, the Control Logic 328, among other things, requests a replay of the instruction, as described with respect to block 624 of FIG. 6. In this case, the Control Logic 328 selects the result generated by the N-path. However, there is also a possibility that the precision of the larger operand is less than or equal to the precision specified by the PC field 308, in which case the R-path will be able to generate a correct final result 336 in one embodiment within the desired time (e.g., within two clock cycles). Therefore, the R-path overrides the N-path such that the Control Logic 328 does not request a replay via the replay request signal 340 but instead provides the final result 336 from the R-path.

In one embodiment, the set of predetermined conditions comprises the two conditions described with respect to FIG. 5. However, other embodiments are contemplated in which the set of predetermined conditions is different. The set of predetermined conditions may depend upon design goals, including performance goals, and upon the design characteristics of the microprocessor 100 and x87 FPU 388, such as the particular semiconductor process technology employed, levels of gate delays, signal propagation times, and the like. For example, it may be observed that a finer granularity of predetermined conditions than the set described in the embodiment of FIG. 5 may be employed at a possible cost of more complexity and die real estate, but with a possible increase in aggregate performance by reducing the number of floating point addition instructions in a given program execution that require a replay. The present inventors have observed that an embodiment of the microprocessor 100 employing the set of predetermined conditions of FIG. 5 provides significant performance improvement in some commercial software applications and benchmarks, apparently because the percentage of cases in which the floating point addition instruction addends and PC field 308 value do not satisfy any of the set of predetermined conditions is so much greater than the percentage of time in which they do satisfy at least one of the set of predetermined conditions that the benefit of faster execution time (2 clock cycles in one embodiment) in the former cases outweighs the disadvantage of slower execution time (due to the replay of the floating point addition instruction) in the latter cases in the aggregate, i.e., over the run time of the software application or benchmark.

Referring now to FIG. 6, a flowchart illustrating operation of the microprocessor 100 of FIG. 1 to perform x87 floating point addition instructions according to the present invention is shown. It should be understood that the order or concurrency of the steps shown in FIG. 6 may be different than shown in the flowchart. For example, in one embodiment, the operation of blocks 604 and 608 may be substantially concurrent in one of the paths of the x87 FPU 388. Flow begins at block 602.

At block 602, the Instruction Dispatcher 120 of FIG. 1 initially dispatches an x87 floating point addition instruction and its operands to the x87 FPU 388 of FIG. 3. Flow proceeds to block 604.

At block 604, the Instruction Dispatcher 120 controls the mux 394 to select addend B 320 and the mux 392 to select addend A 316. Additionally, the Control Logic 328 of FIG. 3 controls mux 396 to select the output of mux 394, i.e., to select addend B 316. The Control Logic 328 computes the difference between the exponents of the addends 316/320 and identifies the larger and smaller of the two addends 316/320 from the difference. The Control Logic 328 shifts the smaller addend mantissa right by the difference to align the smaller addend mantissa with the larger addend mantissa. Zero bits are provided into the leading bit positions of the smaller addend vacated by the alignment right shift. Flow proceeds to block 606 and to block 608.

At block 606, the Adder A 324A and Adder B 324B each begin adding the larger addend to the aligned smaller addend to generate their respective rounded-up and non-rounded-up sums. Flow proceeds from block 606 to decision block 612.

At block 608, the Control Logic 328 analyzes the addends 316/320 with respect to their contribution to the rounding determination and relative to the precision specified by the PC field 308 value in order to determine whether any of the set of predetermined conditions exists. In one embodiment, the set of predetermined conditions is the set described with respect to FIG. 5. However, other embodiments are contemplated in which the set of predetermined conditions is different. The Control Logic 328 analyzes the addends 316/320 at block 608 substantially in parallel with the generation of the respective sums by the Adders 324A and 324B in block 606. Flow proceeds from block 608 to decision block 612.

At decision block 612, the Control Logic 328 determines whether any of the predetermined conditions exist. If so, flow proceeds to block 622; otherwise, flow proceeds to block 614.

At block 614, the Control Logic 328 makes the rounding determination based on the sticky bits contributed by the aligned smaller addend and the precision specified by the PC field 308 value. That is, the Control Logic 328 determines whether or not the rounded-up sum generated by Adder A 324A or the non-rounded-up sum generated by Adder B 324B should be selected by the mux 398 depending upon the value of the sticky bits of the aligned smaller addend in view of the rounding mode specified in the Rounding Control (RC) field 312 of the FPCW 304. The Control Logic 328 performs the rounding determination of block 614 (and the determination at block 612) substantially in parallel with the generation of the respective sums by the Adders 324A and 324B in block 606. Flow proceeds to block 616.

At block 616, the Control Logic 328 controls the mux 398 to select the appropriate rounded-up sum generated by Adder A 324A or the non-rounded-up sum generated by Adder B 324B based on the rounding determination made at block 614. That is, if the Control Logic 328 determines that the sum needs rounding up, then the Control Logic 328 controls the mux 398 to select the rounded-up sum generated by Adder A 324A; otherwise, the Control Logic 328 controls the mux 398 to select the non-rounded-up sum generated by Adder B 324B. Flow proceeds to block 618.

At block 618, the FPU 388 normalizes the properly rounded sum selected at block 616 as needed to generate the final result 336 of the floating point addition instruction. The FPU 388 performs the normalization by shifting until the most-significant binary '1' value bit is to the left of the binary point, as is well-known in the art. Additionally, the FPU 388 clears to zero any bits of the normalized final result 336 that are of less arithmetic significance than the precision specified by the PC field 308. The Retire Unit 126 retires the final result 336 to the architected IA-32 floating point register specified by the floating point addition instruction. In one embodiment, the x87 FPU 388 is advantageously capable of executing the floating point addition instruction according to the steps of blocks 602 through 606 and 612 through 618 (i.e., when a replay is not required) in two clock cycles in a microprocessor 100 manufactured with a 65 nanometer CMOS technology process running at an internal clock frequency of 2.0 GHz. Flow ends at block 618.

At block 622, the Control Logic 328 generates a cumulative sticky bit 338 based on the least significant mantissa bits of the aligned smaller addend that are not directly representable in the intermediate 64-bit result format. That is, in an embodiment in which the Adders 324A and 324B are 64 bit adders, the Control Logic 328 generates a binary '1' cumulative sticky bit 338 if any of the aligned smaller addend mantissa bits below the 64$^{th}$ bit position of the aligned smaller addend are a binary '1'; otherwise, the Control Logic 328 generates a binary '0' cumulative sticky bit 338. The Control Logic 328 generates the cumulative sticky bit 338 in block 622 (and the determination at block 612) substantially in parallel with the generation of the respective sums by the Adders 324A and 324B in block 606. Additionally, the Control Logic 328 controls the mux 398 to select the non-rounded-up sum generated by Adder B 324B. Finally, the FPU 388 saves the cumulative sticky bit 338 in register 348 and saves the non-rounded-up sum generated by Adder B 324B. The saved cumulative sticky bit 348 and the bits of the non-rounded-up sum generated by Adder B 324B that are of less arithmetic significance than the precision specified by the PC field 308 comprise saved rounding information that will be subsequently used by the FPU 388 on the replay of the floating point addition instruction to make the rounding determination. In one embodiment, the FPU 388 saves the non-rounded-up sum generated by Adder B 324B into the rename register allocated to the floating point addition instruction. In one embodiment, the FPU 388 saves the non-rounded-up sum generated by Adder B 324B into a temporary register of the microprocessor 100. Flow proceeds to block 624.

At block 624, the FPU 388 signals the Instruction Dispatcher 120 and the ROB 128 via the replay request signal 340 that the floating point addition instruction needs to be replayed. In one embodiment, when the FPU 388 asserts the replay request signal 340, it also provides the ROB 128 tag of the floating point addition instruction, which the Instruction Dispatcher 120 stores and subsequently outputs at block 628 when the Instruction Dispatcher 120 re-dispatches the floating point addition instruction. Flow proceeds to block 626.

At block 626, in response to the assertion of replay request signal 340 at block 624, the ROB 128 flushes the Execution Unit 124 pipelines of all unretired instructions to avoid instructions that are dependent upon the result of the floating point addition instruction from receiving an incorrect source operand value, since the intermediate result 336 generated by the FPU 388 is not yet correct, i.e., since it still remains to be determined upon the replay of the floating point addition instruction whether or not the intermediate result 336 needs to be rounded-up. After flushing the Execution Unit 124 pipelines, the ROB 128 waits until the floating point addition instruction becomes the oldest instruction in the ROB 128, i.e., until all other instructions older than the floating point addition instruction in program order have retired. Then, the ROB 128 replays all unretired instructions, starting with the floating point addition instruction. In particular, the ROB 128 updates the state of each of the unretired instructions to indicate that they need to be dispatched. Flow proceeds to block 628.

At block 628, the Instruction Dispatcher 120 examines the ROB 128 and detects that the floating point addition instruction needs to be dispatched. In response, the Instruction Dispatcher 120 dispatches, i.e., re-dispatches, the floating point addition instruction to the FPU 388 and simultaneously asserts the re-dispatch signal 344 of FIG. 3 to notify the FPU 388 that this is the floating point addition instruction being replayed that previously requested to be replayed at block 624. In one embodiment, the Instruction Dispatcher 120 knows it needs to assert the re-dispatch signal 344 because, as it is dispatching instructions from the ROB 128, it compares the ROB 128 tag of the instruction about to be dispatched with the ROB 128 tag saved in block 624 and detects that the tags match. Flow proceeds to block 632.

At block 632, the Control Logic 328 makes the rounding determination based on the saved rounding information (e.g., the saved cumulative sticky bit 348 and the sticky bits of the saved sum 346, i.e., the bits of the saved sum 346 that are of less arithmetic significance than the precision specified by the PC field 308) and the precision specified by the PC field 308 value and rounding mode specified by the RC field 312 value. That is, the Control Logic 328 determines whether or not the rounded-up sum generated by Adder A 324A or the non-rounded-up sum generated by Adder B 324B should be selected by the mux 398 depending upon the value of the saved rounding information in view of the rounding mode specified in the RC field 312 of the FPCW 304. In one embodiment, the FPU 388, in response to the replay signal 340 from the Instruction Dispatcher 120, modifies the floating point addition microinstruction to a different type of microinstruction that instructs the FPU 388 to convert the saved sum 346 to the precision specified by the PC field 308 and to round based on the saved rounding information and RC field 312. Flow proceeds to block 634.

At block 634, the Control Logic 328 controls the mux 398 to select the appropriate rounded-up sum generated by Adder A 324A or the non-rounded-up sum generated by Adder B 324B based on the rounding determination made at block 632. Additionally, the FPU 388 normalizes the rounded sum, i.e., the selected sum, as needed to generate the final result 336 of the floating point addition instruction. Additionally, the FPU 388 clears to zero any bits of the normalized final result 336 that are of less arithmetic significance than the precision specified by the PC field 308. The Retire Unit 126 retires the final result 336 to the architected IA-32 floating point register specified by the floating point addition instruction. Flow ends at block 634.

Although the present invention and its objects, features, and advantages have been described in detail, other embodiments are encompassed by the invention. For example, although embodiments have been described in the context of an x87 FPU, other embodiments are contemplated in which other floating point architectures that create conditions in which the FPU cannot make the rounding determination substantially in parallel with the addition of the floating point addition instruction addends preventing the FPU from executing the instruction within the desired number of clock cycles employs the selective replay of the instruction technique described herein. Additionally, although embodiments have been described using positive logic, it should be understood that negative logic may also be employed in other embodiments of the invention.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor (DSP), processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer readable storage medium such as semiconductor, magnetic disk, or optical disc (e.g., CD-ROM, DVD-ROM, etc.). It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    an x87 Floating Point Control Word (FPCW) including a Precision Control (PC) field programmable for specifying a precision of floating point (FP) calculations made by a FP unit (FPU) of the microprocessor;
    an instruction dispatcher, configured to dispatch an x87 FP addition instruction (FPADD) to the FPU, the FPADD having first and second FP addends, wherein mantissas of the first and second addends potentially include bits of lesser arithmetic significance than a precision specified by the PC field; and
    the FPU, configured to:
        add the first and second addends to generate a sum;
        determine whether at least one of a set of predetermined conditions exists in the first and second addends with respect to their contribution to a rounding determination of the sum and relative to the precision specified by the PC field;
        if none of the set of predetermined conditions exists:
            (1) make the rounding determination based on bits of the mantissa of the smaller of the first and second addends and the precision specified by the PC field; and
            (2) selectively round up the sum based on the rounding determination for generating a final result of the FPADD; and
        if at least one of the set of predetermined conditions exists:
            (1) derive rounding information from the first and second addends, save the sum, and save the rounding information;
            (2) signal the instruction dispatcher to re-dispatch the FPADD to the FPU; and
            (3) in response to the instruction dispatcher re-dispatching the FPADD to the FPU:
                (a) make the rounding determination based on the saved rounding information and the precision specified by the PC field; and
                (b) selectively round up the sum based on the rounding determination for generating the final result.

2. The microprocessor of claim 1, wherein one of the set of predetermined conditions comprises:
    an effective addition operation is to be performed by the FPU in response to the FPADD; and
    the precision of the larger of the first and second addends is greater than the precision specified by the PC field.

3. The microprocessor of claim 2, wherein a second of the set of predetermined conditions comprises:
    a difference of the exponents of the first and second addends is greater than one; and
    the precision of the larger of the first and second addends is greater than the precision specified by the PC field.

4. The microprocessor of claim 3, wherein a third of the set of predetermined conditions comprises:
    an effective subtraction operation is to be performed by the FPU in response to the FPADD;
    a difference of the exponents of the first and second addends is less than or equal to one; and
    the precision of at least one of the first and second addends is greater than the precision specified by the PC field.

5. The microprocessor of claim 1, wherein the FPU executes the FPADD in two clock cycles when none of the set of predetermined conditions exists.

6. The microprocessor of claim 1, wherein when the instruction dispatcher re-issues the FPADD to the FPU, the instruction dispatcher also provides to the FPU an indication that the FPADD is being re-dispatched in distinction from the prior dispatch of the FPADD by the instruction dispatcher to the FPU.

7. The microprocessor of claim 1, wherein the saved rounding information comprises bits of the sum having less arithmetic significance than the precision specified in the PC field of the FPCW.

8. The microprocessor of claim 1, wherein the saved rounding information comprises a cumulative sticky bit based on the least significant bits of an aligned mantissa of a smaller of the first and second addends that are not included in the add of the first and second addends to generate the sum.

9. The microprocessor of claim 1, wherein if none of the set of predetermined conditions exists, the FPU is configured to make the rounding determination based on bits of the mantissa of the smaller of the first and second addends that, after being aligned, have less arithmetic significance than the precision specified by the PC field.

10. The microprocessor of claim 1, wherein the FPU is configured to align a smaller of the first and second addends in order to add the first and second addends to generate the sum.

11. A method for processing an x87 floating point (FP) addition instruction (FPADD) in a microprocessor having a FP unit (FPU), an instruction dispatcher, and an x87 Floating Point Control Word (FPCW) including a Precision Control (PC) field programmable for specifying a precision of FP calculations made by the FPU, the method comprising:
dispatching initially an x87 FP addition instruction (FPADD) to the FPU, the FPADD having first and second FP addends, wherein mantissas of the first and second addends potentially include bits of lesser arithmetic significance than a precision specified by the PC field;
adding the first and second addends to generate a sum;
determining whether at least one of a set of predetermined conditions exists in the first and second addends with respect to their contribution to a rounding determination of the sum and relative to the precision specified by the PC field;
if none of the set of predetermined conditions exists:
(1) making the rounding determination based on bits of the mantissa of the smaller of the first and second addends and the precision specified by the PC field; and
(2) selectively rounding up the sum based on the rounding determination for generating a final result of the FPADD; and
if at least one of the set of predetermined conditions exists:
(1) deriving rounding information from the first and second addends, saving the sum, and saving the rounding information;
(2) signaling the instruction dispatcher to re-dispatch the FPADD to the FPU; and
(3) in response to the instruction dispatcher re-dispatching the FPADD to the FPU:
(a) making the rounding determination based on the saved rounding information and the precision specified by the PC field; and
(b) selectively rounding up the sum based on the rounding determination for generating the final result.

12. The method of claim 11, wherein one of the set of predetermined conditions comprises:
an effective addition operation is to be performed by the FPU in response to the FPADD; and
the precision of the larger of the first and second addends is greater than the precision specified by the PC field.

13. The method of claim 12, wherein a second of the set of predetermined conditions comprises:
a difference of the exponents of the first and second addends is greater than one; and
the precision of the larger of the first and second addends is greater than the precision specified by the PC field.

14. The method of claim 13, wherein a third of the set of predetermined conditions comprises:
an effective subtraction operation is to be performed by the FPU in response to the FPADD;
a difference of the exponents of the first and second addends is less than or equal to one; and
the precision of at least one of the first and second addends is greater than the precision specified by the PC field.

15. The method of claim 11, wherein the FPU executes the FPADD in two clock cycles when none of the set of predetermined conditions exists.

16. The method of claim 11, wherein when the instruction dispatcher re-issues the FPADD to the FPU, the instruction dispatcher also provides to the FPU an indication that the FPADD is being re-dispatched in distinction from the prior dispatch of the FPADD by the instruction dispatcher to the FPU.

17. The method of claim 11, wherein the saved rounding information comprises bits of the sum having less arithmetic significance than the precision specified in the PC field of the FPCW.

18. The method of claim 11, wherein the saved rounding information comprises a cumulative sticky bit based on the least significant bits of an aligned mantissa of a smaller of the first and second addends that are not included in the add of the first and second addends to generate the sum.

19. The method of claim 11, wherein if none of the set of predetermined conditions exists, the FPU is configured to make the rounding determination based on bits of the mantissa of the smaller of the first and second addends that, after being aligned, have less arithmetic significance than the precision specified by the PC field.

20. The method of claim 11, wherein the FPU is configured to align a smaller of the first and second addends in order to add the first and second addends to generate the sum.

21. A computer program product for use with a computing device, the computer program product comprising:
a computer readable storage medium, having computer readable program code embodied in said computer readable storage medium, for providing a microprocessor, said computer readable program code comprising:
first program code for providing an x87 Floating Point Control Word (FPCW) including a Precision Control (PC) field programmable for specifying a precision of floating point (FP) calculations made by a FP unit (FPU) of the microprocessor;
second program code for providing an instruction dispatcher, configured to dispatch an x87 FP addition instruction (FPADD) to the FPU, the FPADD having first and second FP addends, wherein mantissas of the first and second addends potentially include bits of lesser arithmetic significance than a precision specified by the PC field; and
third program code for providing the FPU, configured to:
add the first and second addends to generate a sum;
determine whether at least one of a set of predetermined conditions exists in the first and second addends with respect to their contribution to a rounding determination of the sum and relative to the precision specified by the PC field;
if none of the set of predetermined conditions exists:
(1) make the rounding determination based on bits of the mantissa of the smaller of the first and second addends and the precision specified by the PC field; and (2) selectively round up the sum based on the rounding determination for generating a final result of the FPADD; and if at least one of the set of predetermined conditions exists:
(1) derive rounding information from the first and second addends, save the sum, and save the rounding information;
(2) signal the instruction dispatcher to re-dispatch the FPADD to the FPU; and
(3) in response to the instruction dispatcher re-dispatching the FPADD to the FPU:
(a) make the rounding determination based on the saved rounding information and the precision specified by the PC field; and
(b) selectively round up the sum based on the rounding determination for generating the final result.

22. The computer program product of claim 21, wherein one of the set of predetermined conditions comprises:
an effective addition operation is to be performed by the FPU in response to the FPADD; and
the precision of the larger of the first and second addends is greater than the precision specified by the PC field.

23. The computer program product of claim 22, wherein a second of the set of predetermined conditions comprises:
a difference of the exponents of the first and second addends is greater than one; and
the precision of the larger of the first and second addends is greater than the precision specified by the PC field.

24. The computer program product of claim 23, wherein a third of the set of predetermined conditions comprises:
an effective subtraction operation is to be performed by the FPU in response to the FPADD;
a difference of the exponents of the first and second addends is less than or equal to one; and
the precision of at least one of the first and second addends is greater than the precision specified by the PC field.

* * * * *